(12) United States Patent
Rakhman

(10) Patent No.: US 11,034,822 B2
(45) Date of Patent: Jun. 15, 2021

(54) METHOD FOR PRODUCING RECYCLED THERMOPLASTIC RUBBER MASTERBATCH WITH IMPROVED GREEN STRENGTH AND TACK

(71) Applicant: TYREC LTD.

(72) Inventor: Moshe Rakhman, Nesher (IL)

(73) Assignee: TYREC LTD., Shahak Industrial Park (IL)

( * ) Notice: Subject to any disclaimer, the term of this patent is extended or adjusted under 35 U.S.C. 154(b) by 0 days.

(21) Appl. No.: 16/617,620

(22) PCT Filed: May 24, 2018

(86) PCT No.: PCT/IL2018/050566
§ 371 (c)(1),
(2) Date: Nov. 27, 2019

(87) PCT Pub. No.: WO2018/220618
PCT Pub. Date: Dec. 6, 2018

(65) Prior Publication Data
US 2020/0181372 A1    Jun. 11, 2020

(30) Foreign Application Priority Data

May 28, 2017  (IL) ........................................ 252542

(51) Int. Cl.
*C08L 17/00*    (2006.01)
*C08C 19/08*    (2006.01)

(52) U.S. Cl.
CPC .............. *C08L 17/00* (2013.01); *C08C 19/08* (2013.01); *C08L 2205/02* (2013.01); *C08L 2207/20* (2013.01); *C08L 2310/00* (2013.01)

(58) Field of Classification Search
USPC ........................................................ 521/42
See application file for complete search history.

(56) References Cited

U.S. PATENT DOCUMENTS

| 6,313,183 B1 | 11/2001 | Pillai et al. |
| 6,924,319 B1 | 8/2005 | Alsdorf et al. |
| 8,304,458 B2 | 11/2012 | Beirakh |
| 8,309,657 B2 | 11/2012 | Matsushita et al. |
| 9,441,099 B2 | 9/2016 | Rakhman |
| 2009/0082475 A1 | 3/2009 | Zhang et al. |
| 2011/0152390 A1 | 6/2011 | Beirakh |
| 2011/0178191 A1 | 7/2011 | Marc |
| 2013/0036216 A1 | 2/2013 | Chakravarthy et al. |
| 2014/0128499 A1 | 5/2014 | Veyland et al. |
| 2014/0175332 A1 | 6/2014 | Sekhar |
| 2015/0166759 A1 | 6/2015 | Recker et al. |
| 2015/0197581 A1 | 7/2015 | Asadauskas et al. |
| 2015/0247020 A1 | 9/2015 | Sekhar |
| 2016/0312016 A1 | 10/2016 | Khripin et al. |
| 2016/0347926 A1 | 12/2016 | Rakhman et al. |
| 2017/0114155 A1 | 4/2017 | Jasiunas et al. |

FOREIGN PATENT DOCUMENTS

| CN | 1830646 A | 9/2006 |
| CN | 104974435 A | 10/2015 |
| WO | 2015/111037 A1 | 7/2015 |

OTHER PUBLICATIONS

S. Saiwari et al., "Comparative Investigation of the Devulcanization Parameters of Tire Rubbers", Rubber Chemistry and Technology, 2014, vol. 87, No. 1, pp. 31-42 (12 pages total).
S. Saiwari et al., "Devulcanization of Whole Passenger Car Tire Material", KGK 2013, vol. 7, No. 8, pp. 20-25 (6 pages total).
Marvin Myhre et al., "Rubber Recycling: Chemistry, Processing, and Applications", Rubber Chemistry and Technology, 2012, vol. 85, No. 3, pp. 408-449 (42 pages total).
K. Fukumori et al., "Dynamic Devulcanization and Dynamic Vulcanization for Recycling of Crosslinked Rubber 1)", KGK, Jul./Aug. 2006, pp. 405-411 (7 pages total).
International Search Report in International Application No. PCT/IL2018/050566, dated Jul. 12, 2018.
Written Opinion in International Application No. PCT/IL2018/050566, dated Jul. 12, 2018.
Database WPI, Week 201657, Thomson Scientific, London, GB, AN 2016-453166, XP002801445, & BR102014021424 (2 pages total).
Database WPI, Week 201410, Thomson Scientific, London, GB, AN 2013-Q20630, XP002801446, & CN103073741 (3 pages total).

*Primary Examiner* — Terressa Boykin
(74) *Attorney, Agent, or Firm* — Sughrue Mion, PLLC

(57) ABSTRACT

The embodiments of the invention relate to recycled rubber masterbatch which exhibits a sufficient level of green strength and tack. The devulcanization of thermoset rubber is provided by reactive mixing of pulverized rubber, thermoplastic matrix, main-chain backbone antidegradant and green strength enhancer in the presence of a devulcanizing promoter. The embodiments of the invention also provide a thermoplastic dynamically post-vulcanized rubber which comprises at least one devulcanized rubber masterbatch and a polymer, wherein the rubber component is dispersed as a domain in a continuous resin phase and is selectively crosslinked during melt mixing with a molten thermoplastic.

20 Claims, No Drawings

METHOD FOR PRODUCING RECYCLED THERMOPLASTIC RUBBER MASTERBATCH WITH IMPROVED GREEN STRENGTH AND TACK

CROSS REFERENCE TO RELATED APPLICATIONS

This application is a National Stage of International Application No. PCT/IL2018/050566 filed May 24, 2018, claiming priority based on Israel Patent Application No. 252542 filed May 28, 2017.

FIELD OF THE INVENTION

The present disclosure relates to rubber recycling.

BACKGROUND ART

Rubber stocks have uncontrolled variations in the different tire parts (whole tire, tread, sidewall, etc.) due to the different desired characteristics of the product. Generally, a rubber crumb is a complex mixture of unknown diene-based elastomers, fillers, crosslinking agents and oils. The highly unsaturated rubbers such as natural rubber, styrene-butadiene rubber and butadiene rubber comprise conjugated dienes that ordinarily possess an iodine number of between about 20 to about 450. The sulfidic bond type and sulfur concentration is generally a function of the elastomer type.

For elastomers, if the size of the filler particle greatly exceeds the polymer interchain distance, there is introduced an area of localized stress. This can contribute to elastomer chain rupture on flexing or stretching. Fillers with particle sizes greater than 400 nm are generally avoided because they can reduce performance rather than extend or reinforce. A P-TR of minimal size, i.e 200 mesh or ~74 microns has a weak interfacial adhesion to matrix elastomers and may cause stress-raising flaws. Compared to a control tread compound based on a virgin elastomer, the P-TR rises the viscosity and causes a gradual decline in basic physical properties such as tear and fatigue crack growth.

Morphology, surface area and the average size of P-TR depend on the grinding temperature: ambient temperatures produce sponge-like particles, while a cryogenic process gives low surface-area smooth particles. Cryogenic P-TR with a size of less than 40 mesh (~420 micron) has a surface area about 0.08 $m^2/g$, and P-TR produced at ambient temperature has a surface area about 0.4 $m^2/g$.

Because of this complex composition and morphology, devulcanization seems to be a complicated process involving a sequence of chemical and physical interactions and therefore it is considered to be difficult to obtain material with reproducible properties. Rubber can be reclaimed through two primary types of chemical processes, namely devulcanization and depolymerization. In devulcanization, the S—S and S—C bonds are the primary targets. In contrast there to, depolymerization is based on the cleavage of hydrocarbon C=C and C—C main-chains; this shortens the elastomeric backbone length and is much more detrimental to technical properties. Physical, chemical and thermo-mechanical processes cause uncontrolled cracking or cross-linking of main-chains and non-selective cleavage of sulfidic bonds, generate malodorous toxic gases. Chain scission predominates in natural rubber which have electron donating methyl groups attached to the carbon atom adjacent to the double bond and results in softening. Cross-linking predominates in case of BR, SBR, which have comparatively deactivated double bonds and result in brittleness. Chain scission and cross-linking occur simultaneously—the one which prevails, determines the final product properties. In particular, it has been observed that the ratio of main-chain cleavage to crosslink scission, which should be as low as possible, is not easily controlled. The recycling rubber technologies as disclosed in the following background art patents are mostly impractical to produce a full substitute to virgin rubber. The inefficiencies may be due to significant mass transfer limitations caused by the high temperature reaction occurring only on the external P-TR surface. U.S. Pat. Nos. 8,304,458, 8,309,657 and US Patent Application Publications Nos. 2015/0197581, 2015/0247020 describe devulcanization methods where rheological characteristics of the reclaim were not presented. The methods for improving the devulcanization efficiency and the dispersion of the devulcanization aid for whole tires were presented in a paper by S. Saiwari, W. K. Dierkes, J. W. M. Noordermeer, K G K 2013, 7-8, p. 20-25, which paper may be found on the Internet. Chinese Patent CN1830646 (CHEN MINDUO) of 13 Sep. 2006 as an English Translation from Espacenet is cited as background art.

The molecular weight of the original elastomer is 140-300 kDa, while the reclaim is only 40-60 kDa. As such, the recycled rubber differs substantially from the virgin elastomer because of the lack of sufficient viscosity, tack and green strength that required for satisfactory processing of sole rubber parts.

Thermoplastic dynamically vulcanized alloys (TPVs) are a class of compositions that include a finely dispersed cross-linked elastomer phase in a continuous thermoplastic phase. TPVs can be produced by a process called dynamic post-vulcanization, where the elastomeric component is selectively crosslinked during melt mixing with molten thermoplastics. TPVs have the benefits of the elastomeric properties provided by the elastomer phase and processability provided by the thermoplastic phase. Thermoplastic elastomer does not need reclaiming.

SUMMARY AND PRACTICE OF THE INVENTION

A first objective of the invention is to convert a pulverized rubber (P-TR) into recycled thermoplastic rubber masterbatch (reMB) having a certain minimum level of green strength and building tack. These properties can be realized through a maximum devulcanization rate and, simultaneously, a minimum depolymerization rate. In another aspect, an embodiment of the present invention provides a method for processing a P-TR (major dispersed phase), a thermoplastic elastomer matrix composition (minor continuous phase), a main-chain backbone antidegradant and a green strength enhancer in the presence of a promoter devulcanizing composition by shear mixing under a temperature sufficient to destabilize the sulfidic bonds and below a critical cracking temperature for a sufficient residence time. Yet another aspect, of an embodiment of the present disclosure provides a process for producing a composite promoter that includes end-capped metal oxides and support. It is a further object of an embodiment of the present invention to provide a vulcanisate having increased tensile and tear strength, without substantially impacting the viscosity, green strength and tack. The process according to the present invention prevents rubber decomposition, reduces the formation of side byproducts, inhibits malodourous gas release and avoids the risks of spontaneous combustion, further allowing production of reclaim with reduced energy consumption.

In still another aspect of the present disclosure, there is implemented a recycled thermoplastic dynamically post-vulcanized rubber (reTPV) is a class of thermoplastic compositions comprising the reMB of the invention and a crystalline polyolefin. A reTPV refers to rubber-like material "that repeatedly can be softened by heating and hardened by cooling through a temperature range characteristic of the polymer, and in the softened state can be shaped into articles" as defined in ASTM D1566. Alloy reTPV can be produced by a process called dynamic post-vulcanization, wherein the elastomeric component is selectively cross-linked during melt mixing with molten thermoplastic.

Definitions

The following terms used herein throughout the specification and the claims have the following meanings:
AD means a main-chain backbone protecting antidegradant;
Agglomerate means a cluster of particles of one or more compounding materials loosely held together;
Building tack means an inter-diffusion of elastomer blends obtained only through a heating process;
Green strength means the resistance to deformation of a rubber stock in the uncured state;
Heterogeneous mixture is a type of mix wherein two or more phases are present; P-TR (pulverized tire rubber) means clusters of hydrocarbon main-chains with a 3D network—mono-, di- and polysulfidic crosslinks and with developed surface and configuration;
reMB (recycled Rubber Masterbatch) means a tacky-malleable, re-compoundable and re-cured rubber blend having a certain minimum level of viscosity, green strength and surface tack;
reTPV (recycling Thermoplastic dynamically vulcanized rubber) means a composition wherein the post-crosslinked reMB particles are dispersed as a domain in a thermoplastic resin; and
RM (Reactive Mixing) means the shear mixing of P-TR below a critical cracking temperature that is sufficient for scission of sulfidic bonds.

DETAILED DESCRIPTION

1. Devulcanization Process Steps 1.1. Conversion of Cured Rubber into Recycled Rubber Masterbatch.

In sulfur curing, the formation of sulfidic bonds takes place and only these links should be broken during devulcanization. According to a generally accepted mechanism, the accelerated sulfur vulcanization begins with the formation of sulfurating crosslink precursors that subsequently react with sites on the rubber chain with abstraction of allylic hydrogen and addition to the diene bonds. The crosslinks that are formed initially are usually polysulfides with high sulfur rank, which subsequently undergo rearrangement to the more stable mono- and disulfidic bonds and/or degrade to elastically ineffective cyclic and heterocyclic sulfides.

Devulcanization should be the reverse process of vulcanization. From the above reasoning regarding the correlation between curing and devulcanization, it is clear that scission of sulfidic links, recovery of allylic hydrogen and reactive unsaturated sites on an elastomer main-chain backbone should provide the conversion of inert vulcanizate into uncured elastomer. Devulcanization is a process that aims to reverse vulcanization as far as possible without damaging the backbone.

1.2. "Surface Building Tack" Promoters.

Tack is required to exhibit quick stick when building, also provide long term creep resistance before molding. Hydrodesulfurization and oxidative selective cleavage of S—S and S—C bonds are key factors to improving viscosity and building tack.

1.3. Conversion of Main-Chain Backbone and Hydrodesulfurization.

One embodiment of the invention deals with the hydrodesulfurization of allylic carbon on main-chain backbone that provides a recovery of reactive sites on molecular chains. Reaction is performed in the presence of hydrogen sources such as acids, hydro-aromatic substances and tertiary amines that are capable of donating protons. Chemical changes in the bulk elastomer during shear mixing also result in oxidation of the electron-deficient unsaturated elastomer backbone. Auto-oxidation acts on allylic carbon where C—H bond dissociation energy is the weakest. The thermodynamically preferable reaction of oxygen is below 200° C. with main-chain double bonds, forming oxirane cycles due to the protecting agents that are used. This effect is expressed in auto-adhesion increase, also retention of the backbone structure and the resulting mechanical properties.

1.4. Dynamic Oxidative Selective Cleavage of S—S and S—C Bonds.

Promoter chemicals are melted in the presence of polymer/olygomer and are thus distributed homogeneously within the mixture. The blend temperature rises under high shear force mixing. The desulfurization cascade reaction is a process that comprises the subsequent reaction depending from the melting point of the devulcanization promoter components. Sulfidic bonds, which are strong nucleophiles, are oxidized to sulfoxides starting from about 50° C. by electrophilic oxygen transfer from transition metal oxides. The chain-transfer component due to homolytic cleavage above 80° C. causes the scission of sulfidic links. Metal oxide reacts with acid and further organometallic is converted to a catalyst precursor above 110° C. by reaction with sulfidic bonds. The active metal sulfide catalyst promotes reaction of the hydrogen source with the sulfidic bonds to form thiophenes, thiols and hydrogen sulfide at temperature up to about 180° C. The anhydrides and polyprotic acids diffuse and swell the rubber network during shear mixing above their melting point ranging from 130° C. up to 170° C. and react with sulfide radicals and thiols to provide selective condensation with linked sulfur, resulting in a plasticizing effect on the rubber and viscosity reduction. Above 160° C. sulfide radicals can follow a number of possible reaction pathways involving condensation reactions that could lead to degraded or higher molecular mass products and also gas release.

The primary amines and phenolics are selected for inhibition of the autocatalytic sequence of the end-capped metal oxides and act as chain terminators. Transition-metal-catalyzed cascade sequences combine the power of devulcanization chemistry with a minimum of chemicals, providing an ecologically and economically desirable approach. The breakup of sulfidic crosslinks and its transformation into cyclic sulfidic structures on the elastomer backbone is expressed in the decrease of gel fraction, viscous torque and Mooney viscosity, improving the tack and green strength. The increase of the sol fraction may indicate to what extent the rubber network is broken.

1.5. Green Strength Enhancer.

One way of increasing the green strength is to add a einforcing filler to the recycling rubber masterbatch. Examples of such fillers include talc, carbon black, silicate, clay and thermoplastic resin. Another chemical route for increasing the green strength is a partial dynamic vulcanization which can exhibit non-covalent intermolecular interactions (e.g. hydrogen bond, Vander Waal's, electrostatic, etc.). Olefin copolymers comprising maleic anhydride, acrylic acid or vinyl acetate react with ionic curatives as tertiary amines or metal oxides. The fractional curing provides an increase in dimensional stability of the uncured rubber composition.

1.6. Gas Release.

Other problems encountered by the conventional recycling technologies include malodorous toxic gas release (thermo-mechanical or solvent-born processes). When hydrogen donors are mixed with the rubber during recycling, the sulfidic bonds are oxidized, followed by the emissions of hydrogen sulfide and sulfur derivatives.

2. Promoter Composition for Rubber Devulcanization

A promoter composition is designed for targeted scission of sulfidic crosslinks. There is described a novel promoter devulcanization composition which can solve some of the major problems mentioned above. The method of promoter production starts with a structure based on active phase comprising end-capped metal oxides and inorganic support assembly. Coupling of end-capping reagents (ECR), metal oxides and a support surface can be achieved by chemical bonding or physical conjugation. This complexation may be attained by reaction of carboxylic, hydroxyl, amino, thiol, or any other group(s) with a metal oxide and a phyllosilicate or carbonate support surface.

2.1. Metal Oxide Structures.

Transition metal oxos (M=O) have been extensively used for the oxidation of sulfur-organic compounds. Oxygen transfer from metal-oxos to sulfidic links occurs without accompanying bond cleavage in the main-chain backbone. Table 1 shown below presents values of standard reduction potentials of metal cations. The species at the top of Table 1 have a greater likelihood of being reduced while the metals at the bottom of Table 1 have a greater likelihood of being oxidized. Therefore, when a species at the top is coupled with a species at the bottom, the one at the top will become reduced while the one at the bottom will become oxidized.

TABLE 1

Standard reduction potentials.

| Reduction Half-Reactions | E°, v |
|---|---|
| $Fe^{3+} + 3\ e^- \rightarrow Fe^{2+}$ | 0.77 |
| $Mn^{4+} + 4\ e^- \rightarrow Mn^{2+}$ | 1.23 |
| $Cr^{3+} + 3\ e^- \rightarrow Cr$ | −0.74 |
| $Zn^{2+} + 2\ e^- \rightarrow Zn$ | −0.76 |
| $Mg^{2+} + 2\ e^- \rightarrow Mg$ | −2.37 |
| $Ca^{2+} + 2\ e^- \rightarrow Ca$ | −2.87 |

Iron (III) oxide is used for thiol removal by forming insoluble iron sulfide. Me (II) oxide or hydroxide is the most reactive (and with addition of $Me_xO_y$ becomes even more reactive), followed by zinc oxide, aluminum oxide and magnesium oxide. According to another embodiment, the metal of groups 4, 6, 7, 8, 9, 10, 12, 13, 14 are selected from manganese, cobalt, zinc, nickel, iron, molybdenum, tungsten oxides or hydroxides. The metals of group 2 can be chosen from, but are not limited to, magnesium oxide, barium oxide, calcium oxide, or hydroxides and combinations of two or more thereof.

2.2. End-Capping Reagent (ECR).

High energy ionized hydrophilic metal oxides, anhydrides and polyprotic acids are not compatible with low energy non-polar hydrophobic P-TR. The desired promoter configuration for optimum dispersion and devulcanizing efficiency can be provided by nucleation and ligand use. The modification of the hydrophilic nature of the above mentioned chemicals assists a hydrophobization and targeted delivery of the promoter to the rubber surface.

Suitable ECRs include, but are not limited to, dodecenyl butanedioic anhydride, dihydro-furandione, octenyl butanedioic anhydride, dihydro-dioxo-isobenzofurane, isobenzofurandione, maleic anhydride, tetrahydroisobenzofurandione, hexahydroisobenzofurandione, tetrachlorobenzoic anhydride, benzenetricarboxylic anhydride, and methylcyclohexenedicarboxylic anhydride.

Suitable ECRs include, but are not limited to, polyprotic acids: propanedioic acid, butenedioic acid, butanedioic acid, alkylene butanedioic acid, hydroxybutanedioic acid, pentenedioic acid, pentanedioic acid, aminobutanedioic acid, cyclohexene-1,2-dicarboxylic acid, benzene-1,2-dioic acid, and alkyl 2-hydroxy-propanetricarboxylic acid.

Suitable ECRs include but are not limited to, chain transfer agents that are utilized to ensure the viscosity-reduction of the P-TR in the presence of a swelling agent. Suitable chain transfer agents are amines with an alpha-H atom, tertiary amines, dixylene disulfide, pentachlorobenzenethiol, guanidine, dithiobisbenzanilide, and dithiobishydroxybenzene.

2.3. Promoter Composite Support.

Active phase of promoters comprising metal oxides, acids and anhydrides with bulk crystal structure have low reactivity and sulfur adsorption capacity. The support is able to promote active phase potential. Consequently, great effort is made to maximize the surface area of an active phase by the distribution thereof over the support. The support may be inert or may participate in the catalytic reactions. Typical support includes various kinds of corpuscular or lamellar fillers. The lamellar phyllosilicate montmorillonite and graphite are intercalated with metal oxides while mixing. End-capped metal oxides can be incorporated into the support as guest molecules and provide a greater level of activation. Corpuscular carriers such as silica, calcium carbonate, zeolite, aluminum trihydrate, and carbon black provide good dispersion. Preferably, the support substrate is selected from a group including calcium carbonate and talc. Support ranges from 3% to 45% by weight of promoter.

2.4. Promoter Devulcanization Composition Process

In an embodiment, the promoter composition comprises metal oxides that are end-capped with anhydrides and chain-transfer agents on the support. The promoter composite of Section 2.3 comprises a molar ratio of metal oxide $Me_xO_y$ to metal oxide MeO or hydroxide ranges from about 10:0.5 to about 1:2, of metal oxide $Me_xO_y$ to carboxylic anhydride ranges from about 2:1 to about 5:1 and of metal oxide $Me_xO_y$ to the chain-transfer agent ranges from about 20:1 to about 3:1.

In another embodiment, the promoter composition comprises $Me_xO_y$ end-capped with polyprotic acid and a chain-transfer agent on the support. The promoter composite of Section 2.3 comprises a molar ratio of metal oxide $Me_xO_y$ to polyprotic acid ranges from about 10:1 to about 5:10; of metal oxide $Me_xO_y$ to carboxylic anhydride ranges from about 20:1 to about 3:1.

In one embodiment, at least one end-capping reagent and support are combined with metal oxides characterized in that the process comprises a step of mixing. The blending of end-capped reagent and support with metal oxides can take place by solid-state shear compounding ($S^3C$) which can exert fairly strong shear forces. Promoter composition retains stability during storage. The exact amount of devulcanizing promoter depends on the P-TR type and size.

3. Recycled Thermoplastic Rubber Masterbatch (reMB) Processing

Recycled rubber masterbatch reMB refers to any uncured rubber blend consistent with the ASTM D1566. As the devulcanization process takes place, changes in viscosity, auto-tack and cohesion can be easily detected.

3.1. Thermoplastic Matrix Composition Phase.

The melted matrix (minor phase) composition contains a thermoplastic copolymer and/or elastomer and an oligomer. Especially preferred copolymers of olefin with oxygen-containing pendant groups are considered to provide adhesion to polar sites on the P-TR. Copolymers of ethylene and propylene comprise grafted maleic anhydride, an ethylene copolymer with vinyl acetate, and an ethylene copolymer with acrylic acid. Examples of the elastomer, while being non-limiting, are an ethylene-propylene-diene elastomer, an isoprene rubber, a styrenic rubber, a styrenic block polymer. Examples of the oligomer are hydrocarbon resins: C9 resin, C5/C9 resin, terpene resin, polyolefin wax and hydrocarbon wax that provide the wettability of P-TR. Oligomers exhibit a Tg preferably from 40° C. to 100° C. and a molecular weight from 600 to 8000 Daltons. The content of thermoplastic matrix in the blend, based on the weight of the entire mix, is preferably from 3 to 40 wt %. When the content of thermoplastic matrix is significantly less than about 3 wt %, the plasticity and flowability of the mix may be insufficient with the result that devulcanization is difficult or impossible. On the other hand, a content of thermoplastic polymer in the mixture in excess of about 40% does not increase the plasticity and flowability of the product.

3.2. Blend Morphology.

Pulverized rubber or P-TR (major dispersed phase) works as micro-springs dependent on size. Preferably, P-TR is provided in finely divided form, for example at a particle size below 1 mm. Usually, utilizing larger particle size results in poorer melted matrix integrity, which in turn leads to detrimental changes to the technical parameters. Reactive mixing promotes bulk modification and reduces the P-TR size. It is assumed that a third phase (interphase) is formed during the reactive mixing used, which provides better flow and interdiffusion due to improved wetting and phase coupling, and allows to control the distribution of the P-TR and promoter in the matrix, all of which are key factors in promoting uncured green strength and cured strength. The devulcanization degree and distribution of dispersed phase in continuous melted matrix are parameters which influence fatigue life. Product failures arise from defects, so understanding crack propagation is very important when using rubber in applications involving fatigue. Rheological and physical properties can be tested in order to indicate the physical and chemical interactions within the interphase. The relationship between viscoelasticity and crack growth propagation is expressed in green strength, tack, viscosity of uncured mix, and tear strength of vulcanizate.

3.3. Main-Chain Backbone Protecting Antidegradant (AD).

It is known that shear mixing initiates an exothermic reaction that reduces rubber oxidative stability. This process is accelerated by heat and polymer soluble metal carboxylates. A main-chain backbone protecting AD retards oxidative-induced depolymerization during thermal mixing. In some embodiments, an AD is selected from the group including sterically hindered phenolics, quinone imines, alkylated diphenyl amines, dialkyl-phenylenediamines, alkylaryl-phenylenediamines, and polymerized trimethyl-quinoline. It is understood that ADs share the ability to act as chain terminators and peroxide decomposers. The role of AD is also expressed also in efficient retention of viscoelasticity and mechanical properties.

3.4. Recycled Thermoplastic Rubber Masterbatch (reMB) Processing.

The reMB of the invention is admixed in appropriate mixers, according to procedures well known to those skilled in the art. A batch can be admixed in a continuous manner or alternatively, by applying a combination of batches and continuous mixers.

According to some embodiments of the disclosure, the reMB is produced by admixing of a P-TR into a partially melted thermoplastic matrix composition under shear force conditions in the presence of a promoter, a main-chain backbone antidegradant, and a green strength enhancer. In some embodiments, the fill volume of internal mixer is from 55% to 95%, preferably from 65 to 85%. Devulcanization takes place above a temperature sufficient to destabilize the sulfidic bonds and below a critical cracking temperature. A critical cracking temperature is about 200° C. for P-TR, and the Tg for melted polymer is about 100° C. Therefore, the mixture may be melt mixed in a range of 105° C. to 195° C. The exact reaction temperature and duration, and the ratio of chemicals added depends on the P-TR size, melted matrix type, the filling volume and the desired physical properties of the ended reMB. The reMB composition comprises a P-TR from 40 to 95 wt %, a thermoplastic matrix from 3 to 45 wt %, a promoter from 1 to 10 wt %, an antidegradant from 0.3 to 3 wt %, a green strength enhancer from 1 to 10 wt %, based upon 100 total parts by weight of the P-TR. According to some embodiments, the addition of a curing group into the reMB at a following stage improves the surface smoothness, auto-adhesion and cohesion properties of a reMB.

4. Recycled Thermoplastic Dynamically Post-Vulcanized Rubber (reTPV)

Alloy reTPV refers to a rubber-like material as defined in ASTM D1566 and presents a microphase separated system of at least two polymers. One phase is the hard polymer that does not flow at room temperature, but becomes fluid when heated. Another phase is a soft rubbery reMB that gives the reTPV elasticity.

4.1. Hard Phase.

The hard phase is typically the major or continuous phase that gives the reTPV its strength and presents a crystalline polyolefin. In one or more embodiments, the resin includes polypropylene that has a MFR (ASTM D-1238, 2.16 kg@230° C.) of less than 5 dg/min; in other embodiments, less than 1 dg/min or includes polyethylene that has a MFR (ASTM D-1238, 2.16 kg@190° C.) of less than 5 dg/min and in some further embodiments, less than 1 dg/min.

4.2. Elastomeric Phase.

A reTPV by ASTM D1566 definition, refers to "a thermoplastic elastomer with a chemically cross-linked rubbery phase, produced by dynamic vulcanization". Dynamic post-vulcanization is the process of intimate melt mixing of a polymer and a reactive rubbery reMB to generate a cross-linked rubbery phase which is vulcanized under conditions of high shear.

4.3. Production of Recycled Thermoplastic Dynamically Post-Vulcanized Rubber reTPV.

The thermoplastic rubber reMB undergoes a phase inversion during dynamic vulcanization, wherein the blend which initially includes a major volume fraction of reMB, and wherein the polyolefin is the partially melted continuous phase. By blending P-TR with thermoplastics using the method of melt compounding with dynamical stabilization at the interphase, it is possible to produce reTPV whose properties are near those of virgin TPV. An accelerator and a curative are then added to the molten mass, dynamically re-vulcanizing the reMB to produce a post-vulcanization alloy. A phenolic resin curative includes resole, and the accelerator is stannous chloride. Dynamic vulcanization is effected by mixing the ingredients at a temperature which is above the Tg and the curing temperature of the rubber and below cracking temperature. In particular, propylene impact copolymers may be melt mixed at a temperature ranging from 150° C. to 165° C. As a result, the rubber is simultaneously cured and dispersed as fine rough shape particles, which have been described as a "microgel," within the resin matrix. The compounding can be completed with the possible addition of extender oil or polyolefin to obtain the desired hardness. The addition of a filler is preferably performed in the second step. The thermoplastic dynamically post-vulcanized rubber (reTPV) comprises a reMB from 14 to 83% by weight, polyolefin from 17 to 82 wt %, zinc oxide from 0.5 to 5 wt %, stannous chloride from 0.1 to 1 wt %, and resol from 0.5 to 15 wt %, based upon 100 total parts by weight of the polyolefin resin plus reMB. The reTPV according to the present invention may be prepared in a process which takes place at a temperature from 170° C. to 200° C., at a mixing speed of 30-120 rpm, and at a residence time which ranges from 5 to 25 minutes. A unique characteristic of post-vulcanized dynamically polyolefin cured alloy is that the reMB component may be fully re-cured.

5. Industrial Applicability

The reMB and reTPV compositions of the present disclosure have a variety of uses commonly known in the art for other thermoplastic compositions. The present disclosure is not limited to injection molding, and can be applied utilizing compression molding techniques. In another embodiment, reMB and reTPV compositions can be used to produce extruded articles, of surface quality sufficient to be employed in construction and building work.

6. Product Characterization

6.1. Milling Protocol.

The reMB blends comprising curing groups were weighed and mixed per ASTM D-3182. The resulting mixture (which is sometimes referred to hereinbelow as the "base mixture") is transferred to a 2-roll mill operated at ambient temperature with a nip gap of about 2 mm.

6.2. Composite Promoter—Dispersion Test.

Visual assessment of promoter colloidal stability was performed, observing the sedimentation speed. The dispersion of the promoter component in paraffin oil was conducted as follows: 1 g of untreated oxides and promoter were added under stirring of 30 minutes into a tube containing 50 ml of oil. The suspension was then kept for two hours and sedimentation was observed by visual fixation of the boundary between the freely sedimenting part of the dispersion and the dispersion medium. The sedimentation of untreated metal oxides mix was rapid, caused by the hydrophilic particle interaction due to the media. In contrast, the end-capped MeO+Me$_x$O$_y$ composite promoter was dispersed homogenously without noticeable sedimentation after 2 hours, thus, colloidal stability was achieved. The promoter possesses high surface area due to a bulk density ranges up to 0.6 kg/L, which is twice less than that of the mix of the metal oxides.

6.3. Assessment of Functional, Processing and Mechanical Properties of the Compounds.

Rubber soluble (Sol) fraction of the reMB was determined by extraction in a Soxhlet apparatus. The vulcanized and reMB samples were extracted initially for 12 hrs in acetone in order to remove polar substances like remains of oil, resin, followed by an extraction for 12 hours in tetrahydrofurane to remove the apolar components. The extract was dried in a vacuum oven at 40° C. until constant weight. The sol fraction was defined as the soluble fraction in acetone and THF. Corrections for the oil contained in the original rubber crumb have been made.

Rubber Insoluble (Gel) Fraction.

The extracted reMB samples were swollen in toluene for 72 hours at room temperature. The weight of the swollen vulcanizates was measured after removal of surface liquid with absorption paper. The gel fraction was dried under vacuum for 24 hours at 40° C. and weighed after being cooled.

Rheology.

Uncured reMB was characterized by a Mooney viscosity per ASTM D1646 and ML at (1+4@125° C.) on a MDR2000 rheometer at 150° C., according to ASTM D 5289. A relationship exists between S" viscous torque and processability (e.g. die swell) of the uncured compound.

Building Tack Measurement.

A test sample was built from two uncured 15×15 cm sheets with cloth or tape applied to one side and a polyethylene sheet applied to the other side. Before assembly, the polyethylene sheet was removed to expose a fresh surface. Two test pieces were rolled to remove air with a mylar layer 2 cm wide therebetween. A sheet was pressed for 5 min at 100° C. under a 0.5 MPa platen pressure and was cooled for 60 min. The specimens (machine direction) were measured at 100 mm/min.

Green strength was characterized per ASTM D 6746, Part A.

Mechanical Properties of the Vulcanizates.

Tensile properties were measured according to ASTM D412, trouser tear resistance per ASTM D 624, hardness was obtained in Shore A per ASTM D2240. In compression set test, the ability of rubber to recover from a compressive deformation was measured per ASTM D 395.

7. Non-Limiting Examples

The pulverized rubber utilized was TR-40B with size 40 mesh produced by Tyrec Ltd (Israel) from tire tread. The reMB compositions prepared for this series of experiments contained melted matrix, green strength enhancer and antidegradant. Promoter compositions were prepared by the S$^3$C method. Comparative example (US Pat. Application Publication No. 2016/0347926) comprised the following mechanical mix of chemicals: diammonium phosphate (0.5 phr), iron (III) oxide (1 phr), calcium hydroxide (0.9 phr). The following examples are presented for the purposes of illustration and are not limiting the scope of the present disclosure. Base reMB blends were compounded "as is", without virgin rubber addition. Examples 1-5 demonstrated properties of reMB. The following are purely non-limiting examples to provide a clearer understanding of the scope of the invention.

Example 1

The reMB comprised the P-TR, melted matrix and the promoter M-1, the molar ratio of the metal oxide $Me_xO_y$ (part A), metal hydroxide $Me(OH)_2$ (part B), isobenzofurandione (part C), and chain transfer agent (part D) was respectively 10:10:6:0.6; wherein the utilized support was talc (Luzenac 2) as 12% of the total weight of the promoter. About 3 wt % of promoter (based on P-TR), 1 wt % of antidegradant alkylaryl-phenylenediamine Santoflex 6PPD, 6 wt % green strength enhancer—Carbon black N-330—were added to the reMB. The results of the reMB blend analysis are presented in Table 2 hereinbelow for Sample T-1 (without curatives); uncured blend and vulcanizate properties are given in Tables 3 and 4, indexed to the Sample T-11.

Example 2

The reMB comprised the P-TR, melted matrix and the promoter M-2, the molar ratio of the metal oxide $Me_xO_y$ (part A), metal oxide MeO (part B), hexahydromethyl-isobenzofurandione (part C), diphenylguanidine (part D) was respectively 10:50:10:15; wherein the utilized support was calcium carbonate as 28% of the total weight of the promoter. About 6 wt % promoter (based on P-TR), 3 wt % of antidegradant—secondary dialkyl-phenylenediamine Santoflex IPPD, 4 wt % green strength enhancer—ethylene copolymer with vinylacetate were added to reMB. The results of the reMB blend analysis were presented in Table 2 herein below for Sample T-2 (without curatives); uncured blend and vulcanizate properties were given in Tables 3 and 4, indexed to the Sample T-21.

Example 3

The reMB comprised the P-TR, melted matrix and the promoter A-3, the molar ratio of the metal oxide $Me_xO_y$ (part A), pentanedioic acid (B), dithiobisbenzanilide (C) was respectively 10:10:0.6; wherein the utilized support was kaolin with 7 wt % of the total weight of the promoter. About 3 wt % promoter (based on P-TR), 1.5 wt % of antidegradant—sterically hindered polynuclear phenol Vulkanox SKF, 8 wt % green strength enhancer—Carbon black N-760 were added to the reMB. The results of the reMB blend analysis were presented in Table 2 hereinbelow for Sample T-3 (without curatives); uncured blend and vulcanizate properties were given in Tables 3 and 4, indexed to the Sample T-31.

Example 4

The reMB comprised the P-TR, melted matrix and promoter A-4, the molar ratio of the metal oxide $Me_xO_y$ (part A), cis-butanedioic acid (B), isobenzofurandione (part C), pentachlorobenzenethiol (D) respectively was 10:20:10:1.2; wherein the support utilized was graphite with 8% of the total weight of the promoter. About 6 wt % promoter (based on P-TR), 0.5 wt % of antidegradant polymerized trimethyl-dihydroquinoline Vulkanox HS, 2 wt % green strength enhancer—Perkasil 207 were added to the reMB. The results of the reMB blend analysis are presented in Table 2 hereinbelow for Sample T-4 (without curatives); uncured blend and vulcanizate properties were given hereinbelow in Tables 3 and 4, indexed to the Sample T-41.

Example 5

Compositions produced utilizing a mechanical mix of chemicals (comparative example) did not provide a good distribution and dispersion—white and red inclusions were observed on the rubber surface. The properties of the reMB blends without curatives are reported hereinbelow in Table 2. The comparative example did not provide the efficiency of devulcanization as was achieved by utilizing a promoter. End-capped metal oxides on support demonstrated efficient dispersion and devulcanization; lower gel and reMB viscosity were observed.

TABLE 2

Properties of reMB (without curatives) compositions

| reMB blends Promoter type | P-TR | Comparative Example | T-1 M-1 | T-2 M-2 | T-3 A-3 | T-4 A-4 |
|---|---|---|---|---|---|---|
| Gel content, % | 99-100 | 93 | 49 | 54 | 36 | 32 |
| Sol fraction, % | 8 | 23 | 16 | 19 | 17 | 16 |
| Mooney viscosity, 125° C. (1 + 4) | >90 | 65 | 44 | 47 | 42 | |
| Inclusions presence | | Yes | No | No | No | No |
| Gas release (odor) | | Toxic | Usual* | Usual | Usual | Usual |

*Usual-conventional gas release for rubber processing (odor of hot oil and rubber)

The values of gel and sol fractions are a function of the devulcanization process. The comparative sample values of gel and sol indicate that the rate of devulcanization is low, presents a higher gel, and the depolymerization rate is high (higher sol). The process of the disclosure presents a decreased gel content without causing changes in the sol fraction. The latter indicates that the sulfidic bonds were degraded while avoiding rubber network breakage.

The rubber compositions prepared for the following series of experiments contained a conventional amount of wax, zinc oxide, sulfur, and accelerator.

TABLE 3

Processing properties of the reMB self-contained blends with curing group

| Compound Promoter | Comparative example | T-11 M-1 | T-21 M-2 | T-31 A-3 | T-41 A-4 |
|---|---|---|---|---|---|
| Mooney, $ML_4125$ | >90 | 47 | 49 | 44 | 38 |
| MDR at 150 C. | | | | | |
| ML, dNm | 2.1 | 0.6 | 0.7 | 0.9 | 0.7 |
| MH, dNm | 5.2 | 7.3 | 7.9 | 7.3 | 7.4 |
| MH-ML dNm | 3.1 | 6.7 | 7.2 | 6.4 | 6.8 |
| TS2, min | 3.4 | 3.8 | 3.0 | 2.5 | 2.6 |
| TC 50, min | 4 | 4.5 | 3.7 | 3.3 | 3.5 |
| TC 90, min | 6.9 | 6.9 | 6.1 | 6.5 | 6.6 |
| S"@ML | 0.37 | 0.22 | 0.25 | 0.3 | 0.2 |
| S"@MH | 0.5 | 0.34 | 0.42 | 0.3 | 0.3 |
| TanD@ML | 0.22 | 0.4 | 0.44 | 0.3 | 0.36 |
| Green strength, MPa | N/A* | 1.6 | 1.4 | 1.5 | 1.4 |
| Uncured tack, N/cm | N/A* | High** | High | High | high |

*N/A-not applicable-easily separated
**No visible separation line, fracture into the rubber mass The admixture of P-TR with the other components produced according to the disclosure gave rise to a significant improvement of the rheological properties of the resulted blend compared with the composition achieved by a mechanical chemical mix.

In the composition of the disclosure, the viscosity and viscous torque were reduced, and better surface tack and green strength were observed. It was demonstrated that the stiffness of the composition increases when the gel content is higher. The use of a composite promoter lowers the viscosity (Mooney and ML values), and the S" in comparison with the results of the Comparative example. The obtained values (Table 3) correlate with the gel content (Tables 2). The physical properties of the cured reMB blends are reported in the Table 4 hereinbelow.

TABLE 4

Physical properties of the reMB self-contained blends

| Compound Promoter | Comparative Example | T-11 M-1 | T-21 M-2 | T-31 A-3 | T-41 A-4 |
|---|---|---|---|---|---|
| Hardness Shore A | 63 | 55 | 57 | 57 | 56 |
| 100% Modulus, MPa | 3.1 | 2.0 | 2.3 | 2.5 | 2.4 |
| 200% Modulus, MPa | 6.1 | 4.0 | 4.6 | 5.4 | 6.2 |
| 300% Modulus, MPa |  | 6.8 | 7.9 | 9.5 | 8.7 |
| Tensile, MPa | 6.1 | 8.9 | 9.7 | 10.9 | 10.7 |
| Elongation, % | 203 | 368 | 349 | 332 | 353 |
| Trouser Tear, kN/mm | 21 | 84 | 71 | 86 | 83 |

As may be seen from Table 4, the stress-strain and the tear resistance of the cured reMB are higher than in the Comparative example. The higher elongation and tensile strength correlate with lower gel content values as presented in Table 2. The latter indicates that the composite promoter obtained by $S^3$ compounding provides a more intensive re-activation of P-TR, and increased compatibility (intensive phase coupling) with melted matrix phase. It was found that the ratio viscoelasticity/crack propagation expressed in a lower gel content, low viscosity, higher green strength and tack for uncured rubber while the vulcanizate is characterized by improved tear strength and tensile strength.

It has been surprisingly found that a promoter is able to achieve outstanding results in re-activation of rubber surface in a relatively short time treatment, and that the inventive reMB can be used as a direct replacement of virgin elastomer compound. Additionally, it was shown that the inventive promoter inhibits the malodourous gas release during recycling as well as while compounding into the end-product. Rubber masterbatch "as is" exhibits rheological characteristics suitable for injection molding and extrusion. The resulting reMB is capable of satisfying the specifications necessary for successful medium-grade quality articles.

Example 6

In another set of examples, the thermoplastic dynamically post-vulcanized rubber reTPV was a post-vulcanization melt blended polyethylene and polypropylene, with a chemically cross-linked rubbery phase masterbatch T-3, phenolic curative and stannous chloride accelerator to produce the inventive compositions. The tensile strength and elongation at break of each composition were measured. The resulting data are shown hereinbelow in Table 5.

TABLE 5

Properties of the reTPV blend

| Hard phase Polymer | PE | PP |
|---|---|---|
| Modulus 100%, MPa | 3.2 | 3.5 |
| Modulus 200%, MPa | 4.4 | 4.8 |
| Tensile, MPa | 6.1 | 5.8 |
| Elongation, % | 253 | 216 |
| Compression Set 70° C./ 22 hours, % | 47 | 41 |

In summary, the recycled rubber masterbatch according to the present disclosure demonstrates rheological and mechanical properties comparable with those of virgin unvulcanized rubber having a sufficient level of viscosity, green strength and tack, that are absent in known reclaim grades.

The present disclosure was illustrated by using detailed descriptions of embodiments which are provided by way of example only and are not intended to limit the scope of the invention in any way. Some embodiments of the present invention utilize but a portion of the various features or possible combinations of the features.

The invention claimed is:

1. A method for preparing a recycled thermoplastic rubber masterbatch (reMB), the method comprises shear admixing a pulverized rubber (P-TR) in the presence of a devulcanization promoter composition comprising: end-capped metal oxides coupled to a support material, a main-chain backbone protecting antidegradant, a green strength enhancer; wherein said shear admixing is under conditions to cause the formation of an at least partially melted thermoplastic matrix composition; and wherein said reMB comprises uncured rubber blend.

2. The method of claim 1, wherein the pulverized rubber has a size of 10 mesh or smaller.

3. The method of claim 1, wherein said thermoplastic matrix composition comprises a thermoplastic copolymer, elastomer and/or oligomer.

4. The method of claim 1, wherein said end-capped metal oxide comprises a first metal oxide having a chemical formula of $Me_xO_y$, wherein x and y are dependent on the valence of Me, wherein Me is selected from groups 4, 6, 7, 8, 9, 10, 12, 13, 14 of the periodic table; and a second metal oxide of chemical formula MeO or MeOH, wherein Me is selected from the group 2 of the periodic table.

5. The method of claim 1, wherein said end-capped metal oxide is obtained from an end-capping reagent selected from (i) a carboxylic anhydride; (ii) a polyprotic acid, (iii) a chain-transfer agent.

6. The method of claim 1, wherein said support material comprises an inorganic material.

7. The method of claim 1, wherein one or more of the following conditions is fulfilled:
said devulcanization promoter composition comprises a molar ratio of said first end capped metal oxide to said second end capped metal oxide in a ranges from 10:0.5 to 1:2 and
said end-capped metal oxide comprising $Me_xO_y$ is at a molar ratio selected from any one of (i) a molar ratio between said $Me_xO_y$ to said carboxylic anhydride in a range between 2:1 and 5:1; (ii) a molar ratio between said $Me_xO_y$ to said chain-transfer agent in a range between 20:1 and 3:1; and (iii) a molar ratio between said $Me_xO_y$ and said polyprotic acid in a range between 10:1 and 5:10.

8. The method of claim 1, wherein the support material constitutes between 3 and 45 weight percent per 100 parts out of the total amount of said devulcanization promoter composition.

9. The method of claim 1, wherein said main-chain backbone protecting antidegradant is selected from the group consisting of quinone diimines, sterically hindered phenolic, alkylated diphenyl amines, dialkyl-phenylenediamines, alkylaryl-phenylenediamines, polymerized trimethyl-dihydroquinoline, and mixtures thereof and said green strength enhancer comprises at least one of carbon black, silica, silicate, talc, ethylene copolymer with vinyl acetate, ethylene copolymer with acrylic acid, and mixtures thereof.

10. The method of claim 1, comprising admixing said pulverized rubber in an amount of between 40 to about 95 percent by weight, with said thermoplastic matrix composition in an amount between 3 and 45 percent by weight, in the presence of the devulcanization promoter composition in an amount between 1 and 10 percent by weight, the main-chain backbone protecting antidegradant in an amount of between 0.3 and 3 percent by weight, the green strength enhancer in an amount of between 1 and 10 percent by weight, based upon 100 total parts by weight of the pulverized rubber.

11. The method of claim 1, wherein said admixing comprises forming a dispersion of said pulverized rubber in the partially melted thermoplastic-matrix composition, at a dispersion temperature that is below a critical cracking temperature of said thermoplastic matrix composition.

12. The method of claim 11, wherein said admixing is at a dispersion temperature between 105° C. and 195° C.

13. The method of claim 1, comprising admixing of the pulverized rubber (P-TR) with thermoplastic matrix composition, the devulcanization promoter composition, the main-chain backbone protecting antidegradant and the green strength enhancer for a residence time of between 5 and 20 minutes.

14. The method of claim 1, wherein said reMB has a Mooney viscosity value of between 20 and 80 and a green strength value of more than 1 MPa.

15. A devulcanization promoter composition comprising end-capped metal oxides coupled to an inorganic support material, wherein the metal oxide comprises a combination of $Me_xO_y$ with at least one of MeO and MeOH and is end-capped with an agent to render the metal oxide hydrophobic.

16. The devulcanization promoter of claim 15, wherein the metal of said metal oxide is selected from the group consisting of cobalt, zinc, nickel, iron, molybdenum, tungsten, magnesium, barium and combinations thereof.

17. The devulcanization promoter of claims 15, wherein said inorganic support material is selected from (i) a corpuscular filler and (ii) lamellar filler.

18. A method of producing a devulcanization promoter composition according to claim 15, comprising mixing an end-capping reagent, a support material and metal oxide and subjecting the mixture to solid state shear compounding ($S^3C$).

19. A method of obtaining thermoplastic post-vulcanized rubber (TPV) composition, the method comprising mechanically mixing the recycled thermoplastic rubber masterbatch (reMB) obtained by the method of claim 1 into a molten of a crystalline polyolefin in the presence of an accelerator and a curative at a temperature above said crystalline polyolefin glass transition temperature and above curing temperature of said devulcanized rubber to produce said TPV.

20. A thermoplastic post-vulcanized rubber (TPV) composition obtained by the method of claim 1, the TPV composition comprising (i) a continuous phase comprising at least one a crystalline polyolefin and (ii) an elastomeric phase comprising a thermoplastic elastomer according to ASTM D1566.

* * * * *